United States Patent [19]
Spak et al.

[11] Patent Number: 5,712,061
[45] Date of Patent: Jan. 27, 1998

[54] ELECTRODE ARRANGEMENT FOR USE IN A BATTERY HAVING A LIQUID ELECTROLYTE

[75] Inventors: Daniel J. Spak, Cuyahoga Falls; Nicholas Shuster, Madison; David E. Harney, Twinsburg, all of Ohio

[73] Assignee: Northrop Grumman Corporation, Los Angeles, Calif.

[21] Appl. No.: 557,441

[22] Filed: Nov. 14, 1995

[51] Int. Cl.[6] .......................... H01M 12/06; H01M 2/10
[52] U.S. Cl. .......................... 429/208; 429/29; 429/6; 429/68
[58] Field of Search .......................... 429/208, 229, 429/6, 68

[56] References Cited

U.S. PATENT DOCUMENTS

| | | | |
|---|---|---|---|
| 2,044,923 | 6/1936 | Thompson et al. | 429/208 |
| 4,564,570 | 1/1986 | Gordon | 429/68 |
| 4,693,946 | 9/1987 | Niksa et al. | 429/208 |
| 4,707,242 | 11/1987 | Schneider et al. | 204/412 |
| 4,735,876 | 4/1988 | Miura et al. | 429/229 |
| 5,008,162 | 4/1991 | Tomantschger et al. | 429/34 |
| 5,162,172 | 11/1992 | Kaun | 429/155 |

Primary Examiner—Stephen Kalafut
Assistant Examiner—Carol Chaney
Attorney, Agent, or Firm—Walter G. Sutcliff

[57] ABSTRACT

An anode immersed in liquid electrolyte of a battery is threadily engaged with a plastic holder impervious to the corrosive action of the electrolyte. Electrical connection is made to the underside of the anode through a liquid-tight fitting which passes up through the underside of the holder. A sealing gasket is placed at the lower interface between the anode and its holder and the threads are provided with a sealing tape. Additional anode capacity may be provide with the provision of a threaded aperture on the surface of the anode for receiving a supplemental anode having a threaded projection which engages the aperture.

10 Claims, 7 Drawing Sheets

5,712,061

ELECTRODE ARRANGEMENT FOR USE IN A BATTERY HAVING A LIQUID ELECTROLYTE

BACKGROUND OF THE INVENTION

1. Field of the Invention

This invention in general relates to electrochemical cells, and more particularly to an electrode such as an anode used in a liquid electrolyte battery.

2. Description of Related Art

A battery is a device which converts the chemical energy contained in its active materials directly into electrical energy by means of an oxidation-reduction electrochemical reaction. Various types of batteries include a liquid electrolyte in which is immersed a negative electrode, or anode, capable of giving up electrons and which is oxidized during the reaction, as well as a positive electrode, or cathode.

One type of battery which utilizes a liquid electrolyte is a metal-air battery which may typically utilize an anode made of zinc immersed in a liquid potassium hydroxide electrolyte and used to provide power for long, unattended operating periods such as may be required for railroad signaling devices and channel buoys, by way of example.

The liquid electrolyte used in the battery is extremely corrosive and to prolong useful battery life it must be prevented from breaking through to the connection area where the negative power lead wire is attached to the anode material.

The present invention provides for an improved electrode arrangement which will prevent premature loss of battery life due to incomplete anode utilization.

SUMMARY OF THE INVENTION

The present invention is an electrode arrangement for use in a battery having a liquid electrolyte and includes an electrode, as well as an electrode holder which has a cavity for receiving the electrode in a manner such that the electrode has a major surface portion which is exposed to the electrolyte. The arrangement includes sealing means positioned between the interior of the cavity and the electrode for excluding the electrolyte from the unexposed portion of the electrode when the electrode is positioned within the holder and immersed in the electrolyte. An electrical lead is connected to the electrode with a fitting which prevents seepage of any electrolyte. In one embodiment, the electrode is a cylindrical anode having a threaded portion which engages a complimentary threaded section within the cavity. The sealing means includes a gasket positioned at the bottom of the cavity as well as a sealing tape wrapped around the threads of the anode.

DESCRIPTION OF THE PREFERRED EMBODIMENTS

Figure 1:
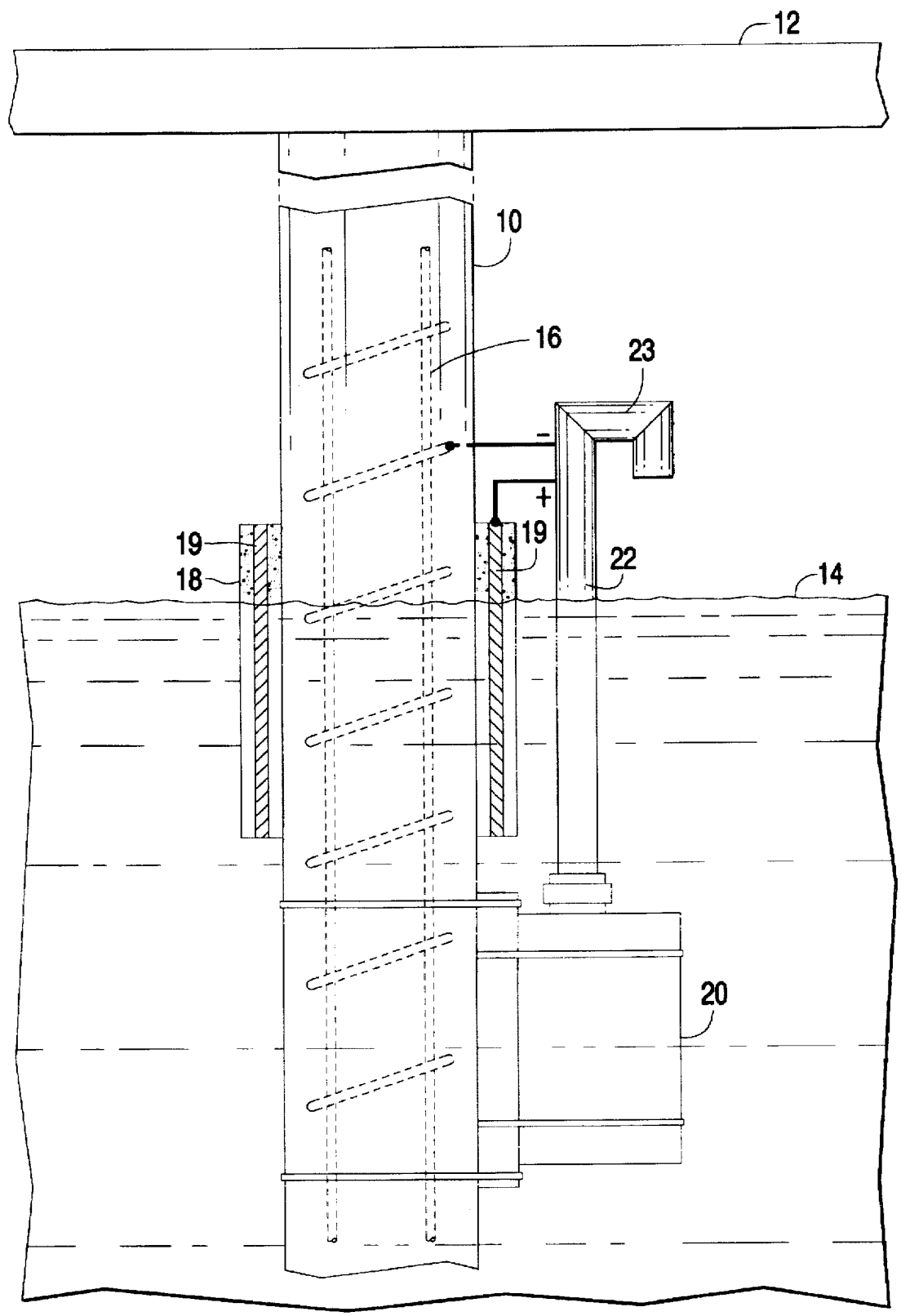
FIG. 1 illustrates an environment in which the present invention may be utilized.

FIG. 1 illustrates one use of a metal-air battery in a remote cathodic protection installation for bridges and marine structures constructed of steel reinforced concrete.

In FIG. 1 a concrete piling 10 supports a road deck 12 over a body of saltwater 14. The reinforcing bars 16 in the concrete pilings are attacked by the combination of air and saltwater, eventually resulting in spauling of the concrete and exposure of the reinforcing bars. The situation manifests itself in a splash zone which is the region between low-tide water level and approximately three feet above high altitude water level. To prevent this action, a cathodic protection arrangement may be utilized.

In one type of cathodic protection arrangement, an appropriate voltage is applied between the reinforcing bar 16 and an inert anode positioned within a jacket 18 in the splash zone. The anode 19 is connected to the positive element of a battery 20 shown affixed to piling 10 in the water below the splash zone, while the reinforcing bars 16 are connected to the negative element of the battery. Air for the metal-air battery is supplied via a standpipe 22 having a U-shaped section 23 at the upper end thereof to prevent the elements, and debris, from falling into the battery 20.

Figure 2:
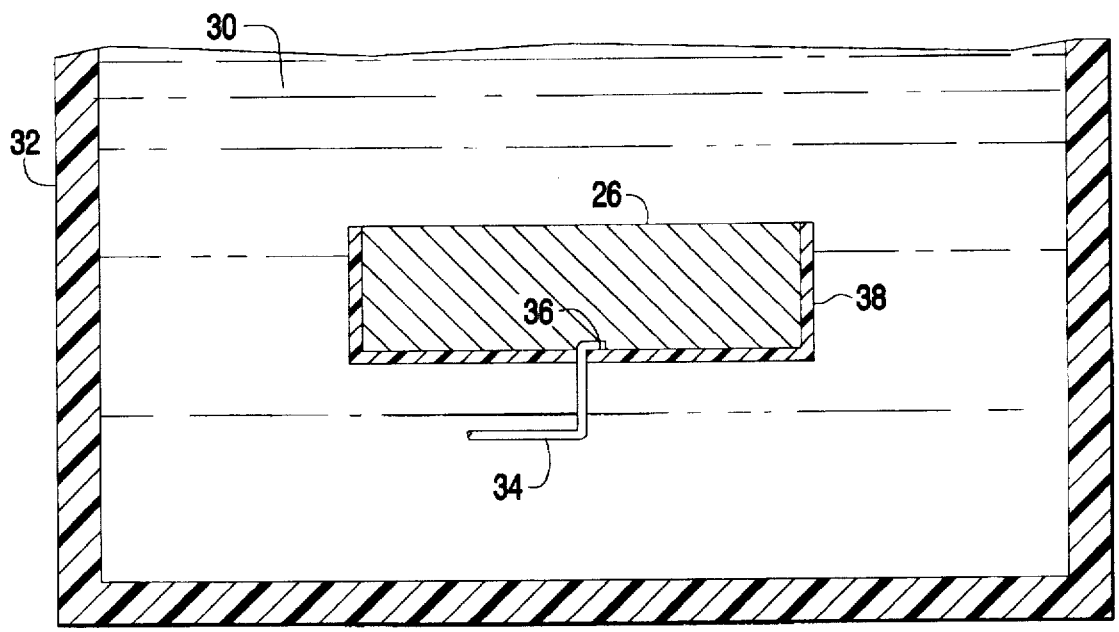
FIG. 2 is a simplified presentation of a corrosion problem in a metal-air battery anode.

Although the electrode arrangement of the present invention finds use with a variety of electrochemical cells, it will be described by way of example in conjunction with a long-life metal-air battery. FIG. 2 illustrates a portion of such battery with an electrode, the anode 26, immersed in a liquid electrolyte 30 within container 32. An electrical power lead 34 is electrically connected to the underside of anode 26 at electrical connection area 36.

FIG. 2 serves to illustrate the problem of protecting the contact area 36 from exposure to the surrounding liquid electrolyte, a phenomenon termed "breakthrough". With a breakthrough, a reaction occurs such that an additional current path is set up in parallel with the preferred external load path and the battery voltage drops because of the higher total current draw from the anode, and power to the external load drops proportionately. When this occurs, the useful battery life is terminated requiring a battery replacement even though a considerable amount of anode fuel may still be available.

One suggested solution to the breakthrough problem has been the application of a protective coating 38 on the anode's inactive side. Such coatings have included the use of paints, polyurethanes and epoxy coatings. Such coatings may work satisfactorily for a while depending upon the chemical stability of the coating in the electrolyte. The long-term ability of these coatings to protect the anode have generally been unsatisfactory due to softening of the coating over time and the inability of the coating to adhere tightly to the anode material. As a result, liquid electrolyte tends to seep between the coating and the anode surface and eventually ends up at the connection area 36 whereby breakthrough occurs.

Figure 3:
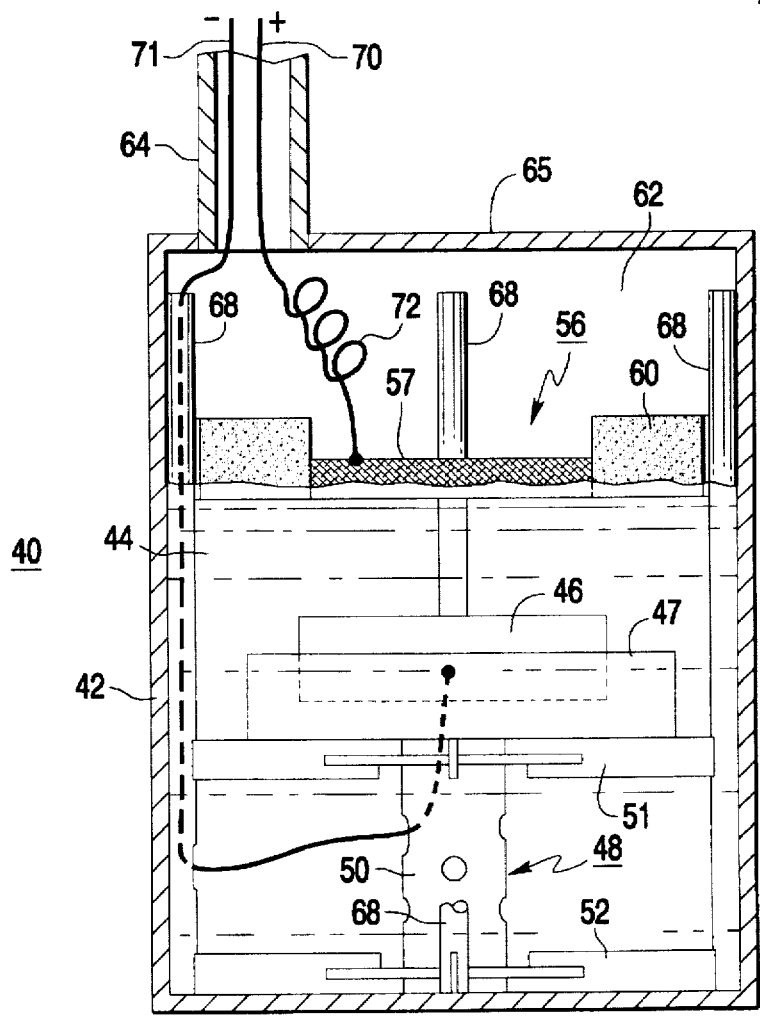
FIG. 3 is a simplified presentation of a metal-air battery in which the present invention may be used.
Figure 4:
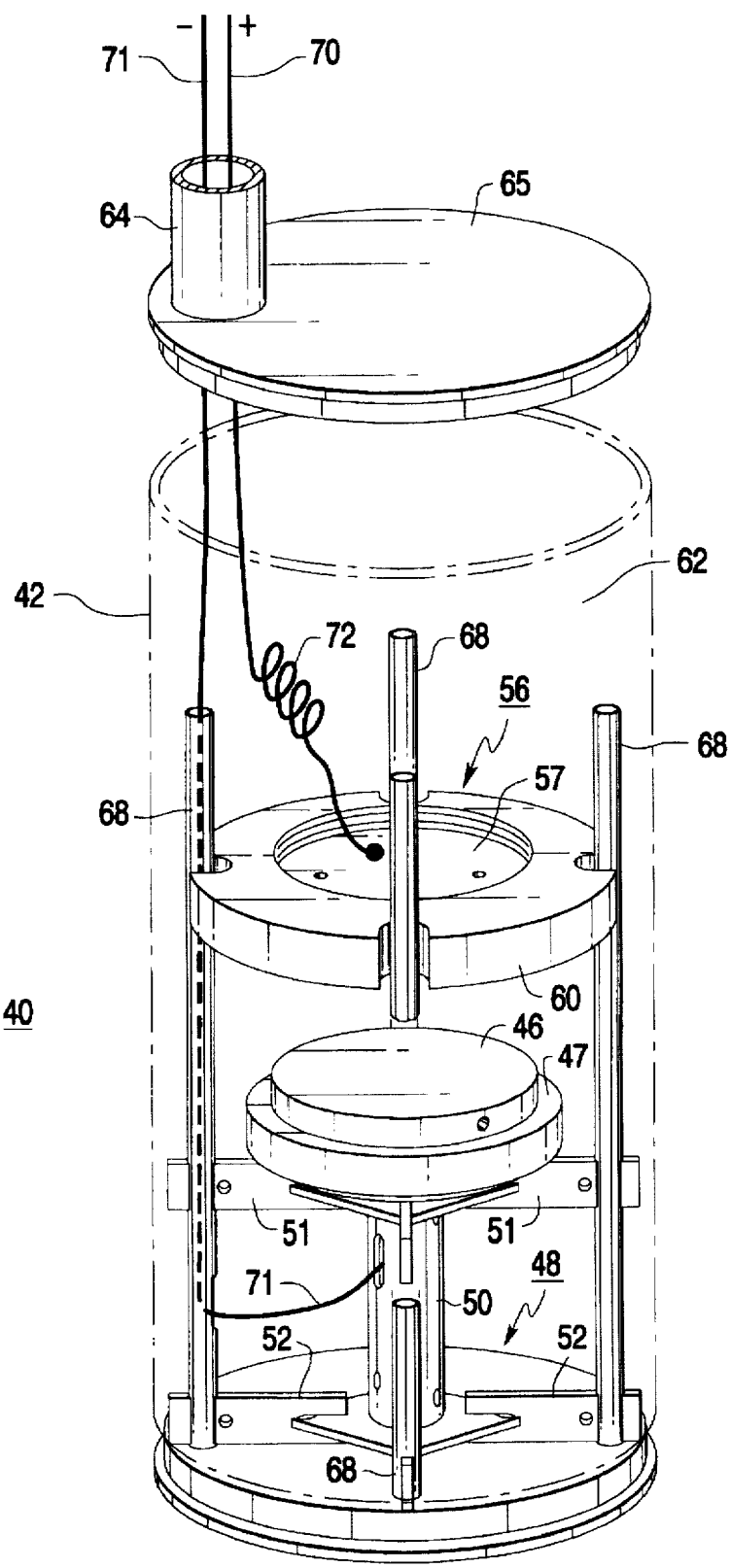
FIG. 4 is a pictorial view of the battery of FIG. 3.

The present invention circumvents the breakthrough problem, and to this end reference is made to FIGS. 3 and 4 illustrating a metal-air battery 40 having an anode arrangement in accordance with one embodiment of the present invention. Battery 40 includes a case 42 (shown in phantom line in FIG. 4) partially filled with an electrolyte 44 such as a potassium hydroxide solution which is stable over a wide range of temperatures and will not freeze until the ambient temperature drops below −40° F.

The battery includes an anode 46 such as of zinc and contained within an anode holder 47 such that only a portion of the anode surface is exposed to the electrolyte 44. The anode is completely immersed in the electrolyte 44 and is held in position by means of a support structure.

One example of a support structure, 48, includes an apertured vertical support tube 50 affixed to the underside of anode holder 47 and to which is connected upper and lower laterally extending arms 51 and 52.

The battery includes an air cathode arrangement 56 at the surface of the electrolyte positioned such that a portion of the cathode is within the electrolyte and the remainder is above the surface. Cathode arrangement 56 includes cathode 57 which is a rigid, rugged, reticulated foam structure which may be 0.5 inches thick and coated with a catalytic layer of silver or similarly effective oxygen reduction catalyst. One type of reticulated structure which may be used is a commercially available metallic foam such as nickel foam, and having a porosity of approximately 40–45 pores per inch. Such structure can be cut into circles, squares or any geometric shape.

In the battery illustrated, the air cathode 57 is horizontally disposed and floats at the surface of the electrolyte 44. This is accomplished by means of a float collar in the formula float ring 60 of a material such as a closed cell polyolefin foam with the arrangement being sized to cover substantially all of the electrolyte surface. Such arrangement prevents needless evaporation and contributes to long life. As the electrolyte level in the battery drops due to consumption of water, the float ring simply tracks the change in liquid level and continuously maintains the required interface whereby the cathode 57 is in contact with the liquid electrolyte 44 as well as air supplied to chamber 62 from outside of the battery by means of a standpipe 64 connected to the top 65 of case 42.

As an alternative to the floating cathode arrangement, a stationary horizontal cathode may be supported in place at the electrolyte surface and would be of a thickness to accommodate changes in electrolyte level.

The tracking of the liquid level by means of float ring 60 is aided with the provision of a plurality of guides in the form of vertical rods 68 which may be held in position by the upper and lower laterally extending support arms 51 and 52.

Suitable electrical connection is made to the electrodes by means of positive and negative electrical leads 70 and 71 connected respectively to the cathode 57 and anode 46. In order to accommodate for vertical movement of the cathode arrangement 56, the positive electrical lead 70 may be provided with a plurality of loops 72. The negative lead 71 may be connected to the underside of cathode 46 via apertured vertical support tube 50.

Figure 5:
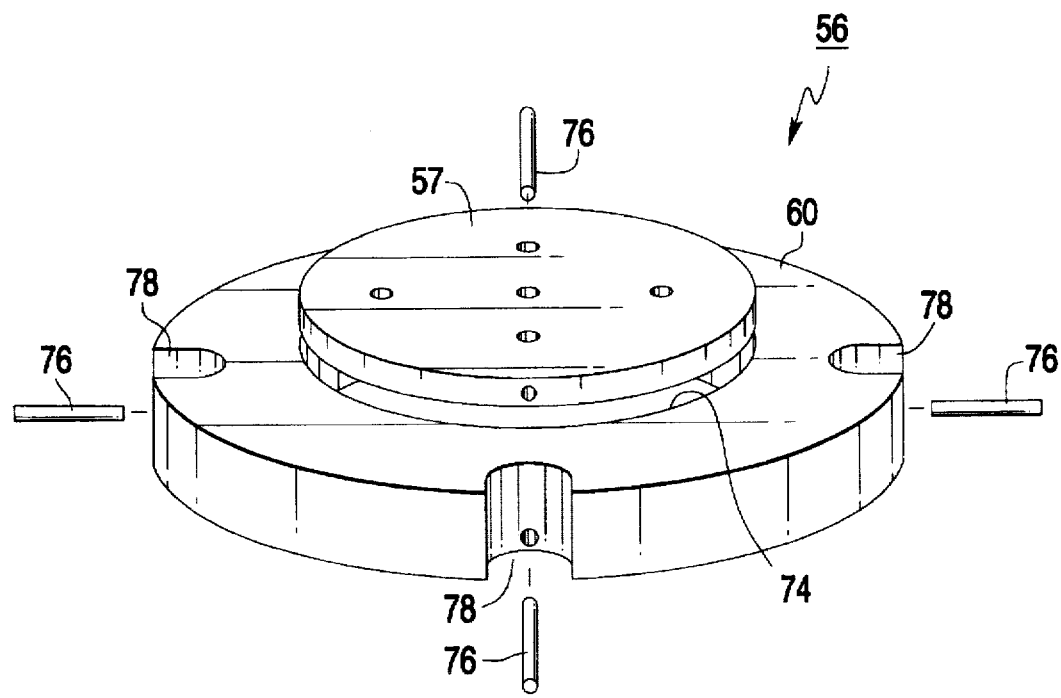
FIG. 5 is an exploded view of the floating cathode arrangement of the battery.

FIG. 5 is an exploded view of the air cathode arrangement 56. The cathode 57 is in the form of a right circular cylinder of a diameter which matches the diameter of inner aperture 74 of float ring 60. The cathode 57 is set into aperture 74 such that the lower surface of cathode 57 is even with the lower surface of float ring 60 and is held in place by means of a plurality of dowel pins 76.

Figure 6:
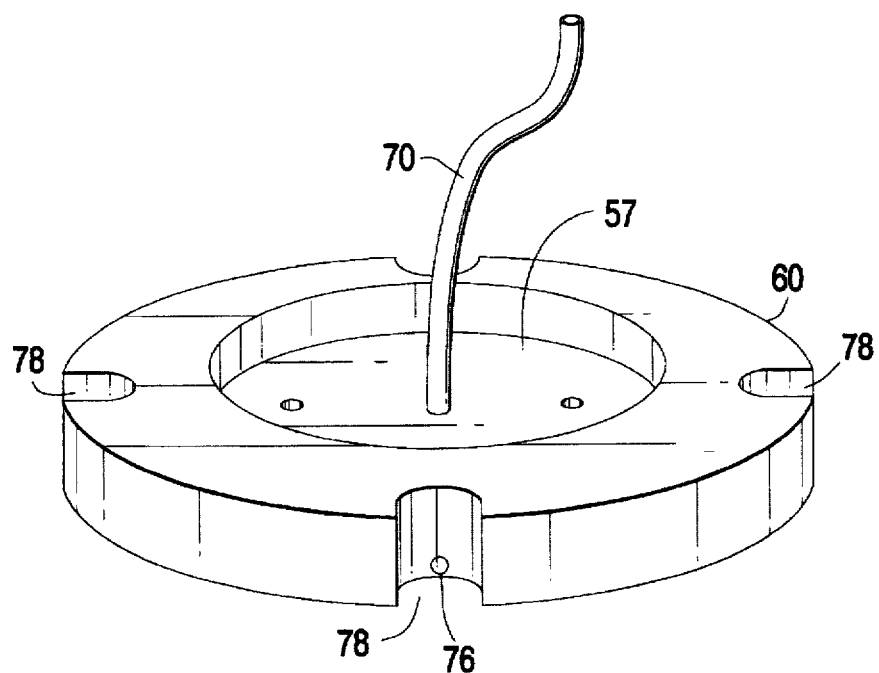
FIG. 6 is an assembled view of the floating cathode arrangement.

In order to accommodate for movement along the vertical guide rods 68, the float ring includes a plurality of cutouts in the form notches 78 which receive a respective one of the guide rods 68. In this manner the cathode 57 can move vertically without any twisting. As illustrated in FIG. 6, electrical lead 70 suitably coated for insulative protection against the electrolyte can be electrically connected to cathode 57 such as by means of conductive silver epoxy.

Figure 7:
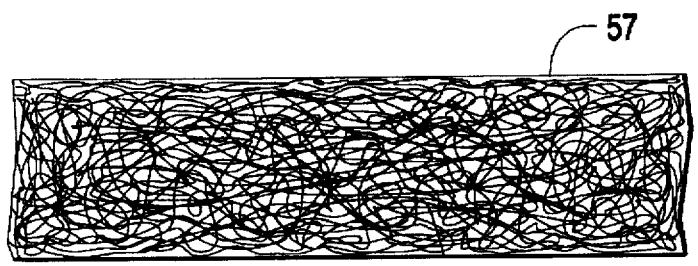
FIG. 7 is illustrative of a reticulated metallic foam which may be used as the cathode in the battery.
Figure 8:
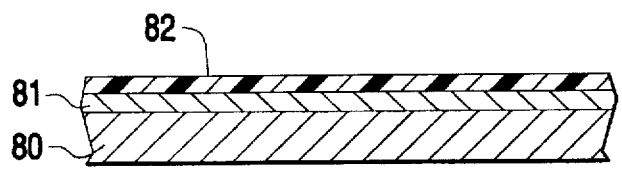
FIG. 8 is a cross-sectional view of various coatings which are applied to the metallic fibers of the metallic foam of FIG. 7.

FIG. 7 illustrates a section of the reticulated cathode. As previously stated, the reticulate can be formed of a nickel metal foam, however any reticulate that can accept the deposited silver catalyst may be utilized. In order to prevent capillary wicking and flooding of the active silver surface on the reticulate, the cathode 57 is wet-proofed with a suitable hydrophobic coating. A strand 80 of the reticulated cathode 57 is illustrated in FIG. 8 together with a coating of the oxygen reduction catalyst such as silver 81, and a hydrophobic coating 82 such as polytetrafluroethylene or fluorinated ethylene-propylene (FEP).

Figure 9:
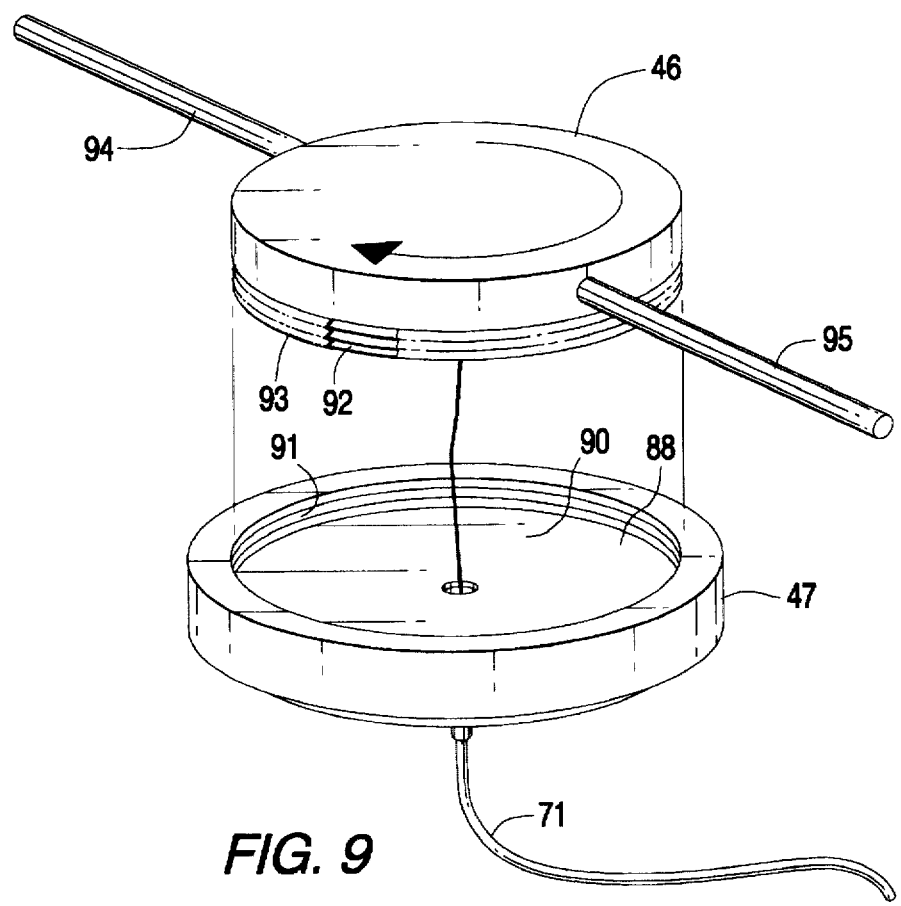
FIG. 9 is a view illustrating the placement of the anode of the battery into a battery holder in accordance with one embodiment of the present invention.

In FIG. 9, illustrating one embodiment of the present invention, the anode 46 is shown being inserted into the anode holder 47 which may be of a plastic material such as PVC. In order to seal the bottom of the anode and eliminate creep of the electrolyte under the anode, a rubber-face gasket 88 is positioned within a cavity 90 of the anode holder 47, the inner wall of which is threaded as at 91 to accommodate threads 92 on the lower portion of anode 46. Teflon tape 93 on threads 92 constitute additional sealing means for excluding the electrolyte from the unexposed portion of the anode 46 when it is positioned within the holder 47 and immersed in the electrolyte.

Figure 10:
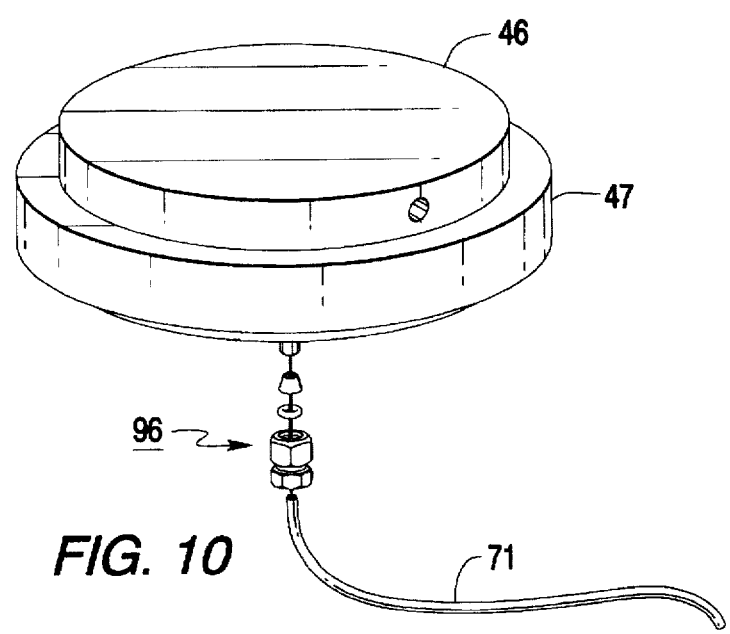
FIG. 10 illustrates the anode situated in its holder.

Electrical lead 71 suitably insulated against the electrolyte, passes through the bottom of the anode holder 47 and makes electrical contact with the anode 46. Rods 94 and 95 may be inserted into pre-drilled apertures in anode 46 for screwing the anode 46 into the anode holder 47 and thereafter removed, as illustrated in FIG. 10 which also illustrates an exploded view of a connecting arrangement 96 by which lead 71 is connected to anode 46.

Figure 11:
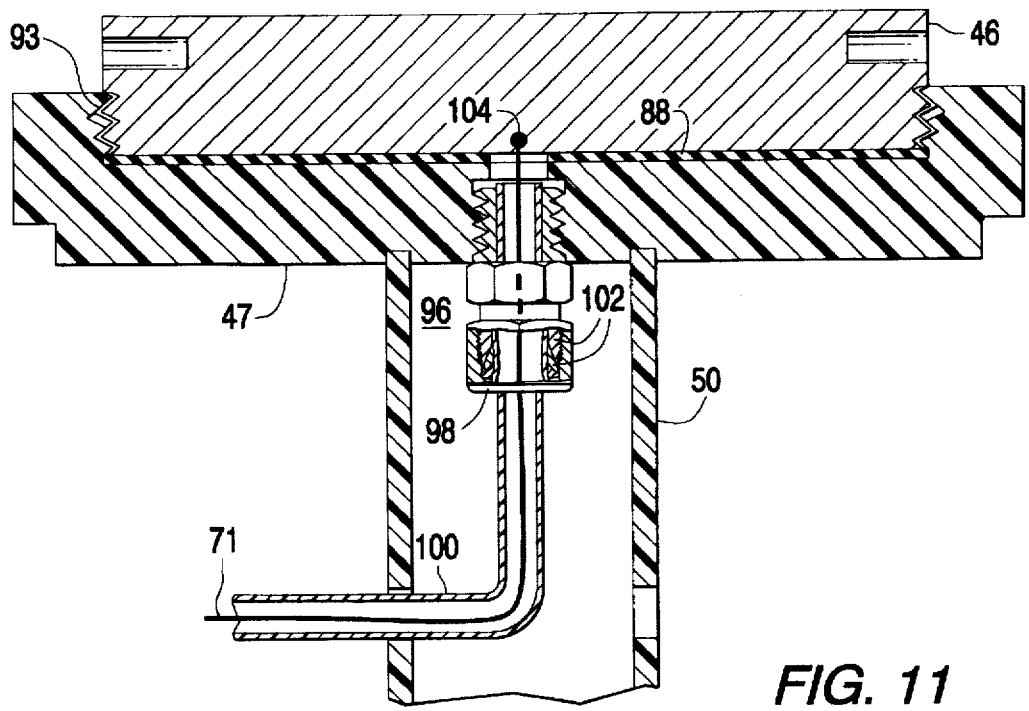
FIG. 11 is a cross-sectional view showing the anode arrangement in more detail.

The assembled and electrically connected anode is further illustrated in FIG. 11. The connecting arrangement 96 includes a pipe-to-tubing connector 98 which allows for a corrosion resistant and inexpensive polyethylene tube 100 protecting the negative lead 71 to be introduced to the underside of anode 46. The fitting 98 is sealed in place by means of stainless steel ferrules 102. Lead 71 within tube 100 passes up through the connecting arrangement 96 and is electrically connected to the bottom of the metal anode 46 by a suitable connection 104. With this arrangement no electrolyte can enter tube 100 and neither the negative lead 71 nor the connection 104 are exposed to electrolyte thus eliminating the possibility of localized short circuits developing.

Figure 12:
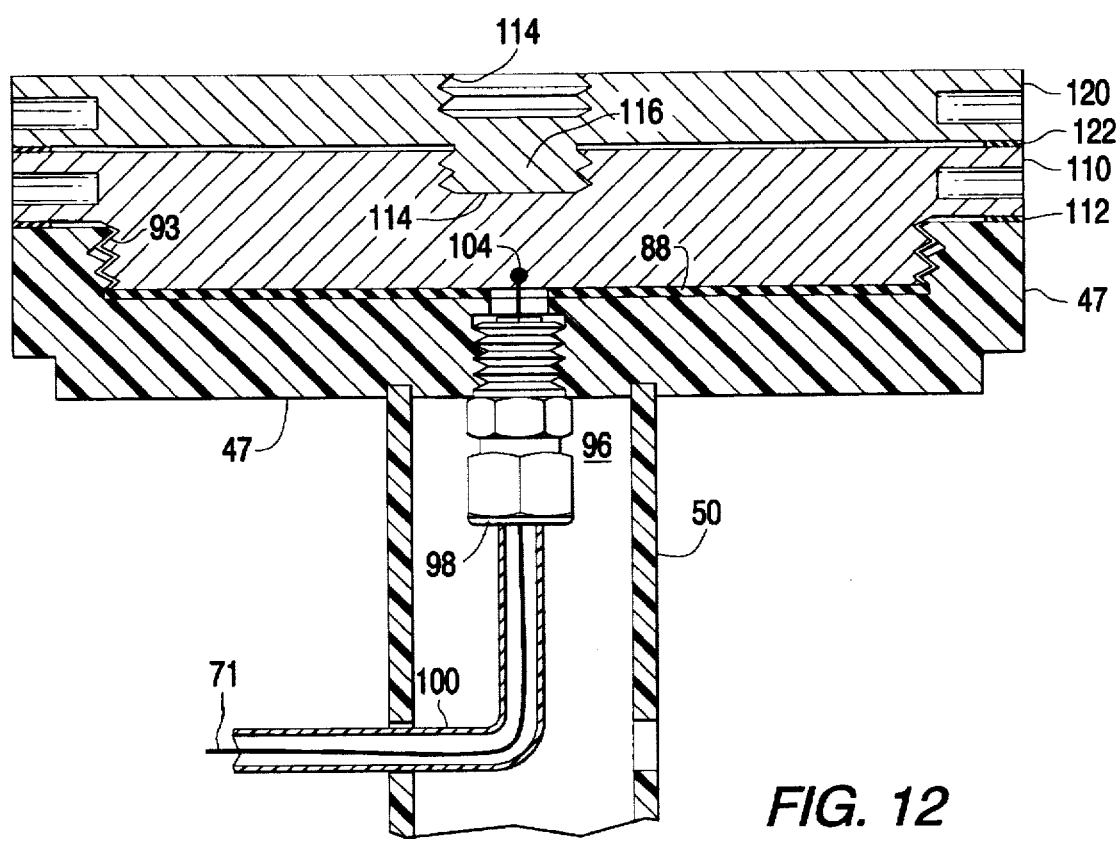
FIG. 12 illustrates an anode arrangement in accordance with another embodiment of the present invention for increasing the volume of anode utilized.

Additional capacity, and hence longer life, can be added to the anode by either initially supplying a thicker anode or by an arrangement such as illustrated in FIG. 12. Anode 110, generally in the shape of an inverted top hat, is threadily secured to the anode holder 47 with gasket 88 and sealing tape 93 wrapped around the threaded portion of anode 110.

A sealing gasket 112 is provided on the undersurface of the rim of the anode 110 to prevent ingress of electrolyte. Anode 110 includes a threaded recess 114 to accommodate a matching threaded extension 116 on a supplemental anode 120 which may also include a threaded recess on the top thereof to, in turn, accommodate another supplemental anode. In this manner, the required thickness of anode may be built up using supplemental anodes of standard or various thicknesses. A second sealing gasket 122 is utilized to prevent ingress of electrolyte between anodes 110 and supplemental anode 120.

Figure 13:
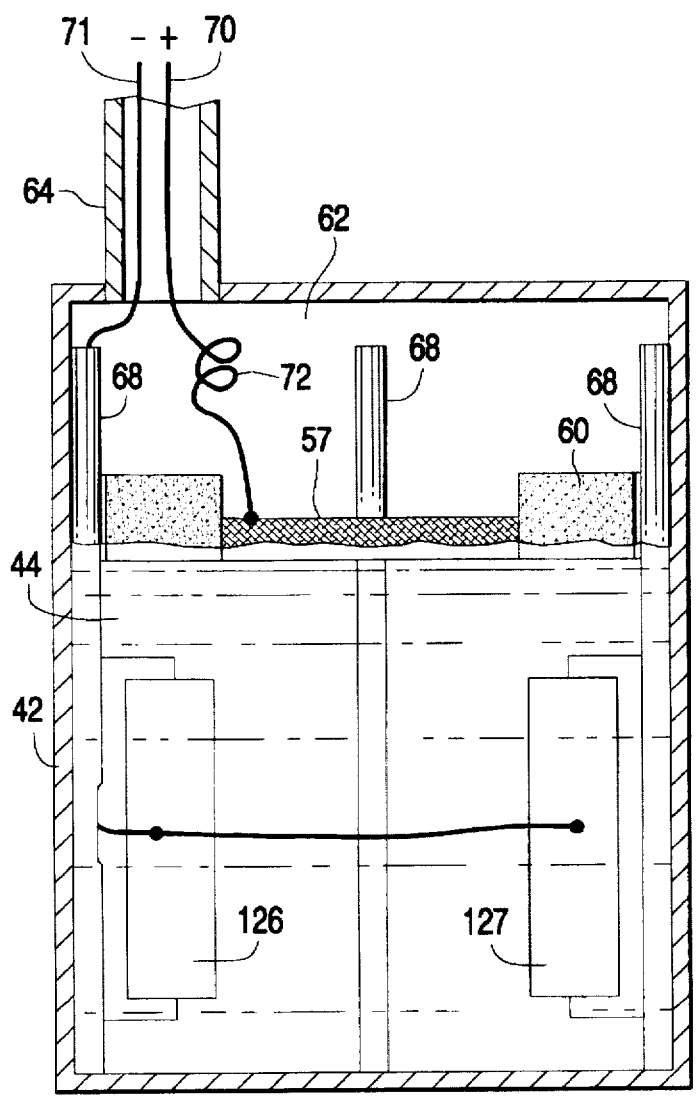
FIG. 13 illustrates an alternate anode orientation of the present invention.

In the configuration of the battery thus far described, the major active area of the anode is a flat planar surface horizontally disposed and facing upward toward and parallel with the electrolyte-air interface. FIG. 13 illustrates another embodiment of the battery wherein the anode is vertically oriented. FIG. 13 illustrates, by way of example, two anode arrangements 126 and 127 as previously described, completely submerged and facing one another in the electrolyte 44. The negative electric lead 71 would be arranged to be in electrical contact with both anodes. The vertical orientation of the cathode or cathodes advantageously allows any solid reaction products which might form on the surface of the anode to fall off and drop to the bottom of the battery case 42.

We claim:

1. An electrode arrangement for use in a battery having a liquid electrolyte, comprising:
   a) an electrode having first, second and peripheral wall surfaces;
   b) an electrode holder completely immersed in said electrolyte and having an open end and closed end defining a cavity for receiving said electrode such that said electrode has a major surface portion exposed to said electrolyte;
   c) sealing means positioned between the interior of said cavity and said electrode for excluding said electrolyte from the unexposed portion of said electrode when said electrode is positioned within said holder and immersed in said electrolyte; and
   d) an electrical lead connected to said electrode.

2. An electrode arrangement according to claim 1 wherein:
   a) said sealing means includes a gasket positioned between said electrode and said closed end of said holder of said cavity.

3. An electrode arrangement according to claim 2 wherein:
   a) said electrode is circular and includes threads on said peripheral wall surface thereof;
   b) said holder includes threads on an inner wall thereof to accommodate said threads of said electrode.

4. An electrode arrangement according to claim 3 wherein:
   a) said sealing means includes a sealing tape wrapped around said threads of said electrode.

5. An electrode arrangement according to claim 3 wherein:
   a) said electrode includes a top surface; and which includes:
   i) support means connected to said holder so as to maintain said top surface of said electrode in a horizontal orientation during battery operation.

6. An electrode arrangement according to claim 5 wherein:
   a) said support means includes a hollow tube connected to the underside of said holder;
   b) said electrical lead being connected to said electrode at the underside thereof, said lead passing through the interior of said hollow tube and through the underside of said holder.

7. An electrode arrangement according to claim 6 which includes:
   a) a fluid tight fitting inserted into said underside of said holder;
   b) said lead passing through said fitting.

8. An electrode arrangement according to claim 1 wherein:
   a) said electrode includes a threaded aperture in the surface thereof; and which includes
   b) a supplemental electrode having a threaded extension engaged in said threaded aperture.

9. An electrode arrangement according to claim 8 wherein:
   a) said supplemental electrode includes a threaded aperture in the surface thereof to accommodate an additional supplemental electrode.

10. An electrode arrangement according to claim 1 wherein:
    a) said electrode is an anode of a metal-air battery.

* * * * *